(12) United States Patent
O'Keefe

(10) Patent No.: US 9,135,831 B2  
(45) Date of Patent: Sep. 15, 2015

(54) SYSTEM AND METHOD FOR DEMONSTRATING A PATH OF A PROJECTILE

(71) Applicant: Bryan P. O'Keefe, Long Valley, NJ (US)

(72) Inventor: Bryan P. O'Keefe, Long Valley, NJ (US)

(*) Notice: Subject to any disclaimer, the term of this patent is extended or adjusted under 35 U.S.C. 154(b) by 361 days.

(21) Appl. No.: 13/748,591

(22) Filed: Jan. 24, 2013

(65) Prior Publication Data

US 2014/0205992 A1     Jul. 24, 2014

(51) Int. Cl.
  *G09B 23/10*   (2006.01)
  *G09B 23/00*   (2006.01)
(52) U.S. Cl.
  CPC ............... *G09B 23/10* (2013.01); *G09B 23/00* (2013.01)
(58) Field of Classification Search
  CPC ........ G09B 23/00; G01B 3/46; G01B 5/0023; F41J 5/06
  USPC ............................................................. 33/506
  See application file for complete search history.

(56) References Cited

U.S. PATENT DOCUMENTS

| | | | |
|---|---|---|---|
| 3,962,793 A * | 6/1976 | Blume ........................... 33/506 |
| 4,805,159 A * | 2/1989 | Negendank et al. .......... 367/127 |
| 5,241,518 A * | 8/1993 | McNelis et al. ............... 367/127 |
| 5,258,962 A * | 11/1993 | Karlsen ......................... 367/127 |
| 6,563,763 B2 * | 5/2003 | McNelis ....................... 367/127 |
| 7,533,612 B1 * | 5/2009 | Papayianis et al. ........... 102/211 |
| 2002/0139895 A1 * | 10/2002 | McNelis ....................... 244/3.1 |
| 2014/0205992 A1 * | 7/2014 | O'Keefe ....................... 434/365 |
| 2014/0347675 A1 * | 11/2014 | Romashkin ................... 356/614 |

* cited by examiner

*Primary Examiner* — Yaritza Guadalupe-McCall

(57) ABSTRACT

A system for demonstrating a path of a projectile comprises a flexible wire, a first attachment device connected to a first end of the flexible wire, a second attachment device connected to a second end of the flexible wire, a coupling assembly comprising a trajectory rod attachment device configured to attach to a trajectory rod and a wire attachment device movably connected to the trajectory rod attachment device and configured to attach to the flexible wire.

15 Claims, 4 Drawing Sheets

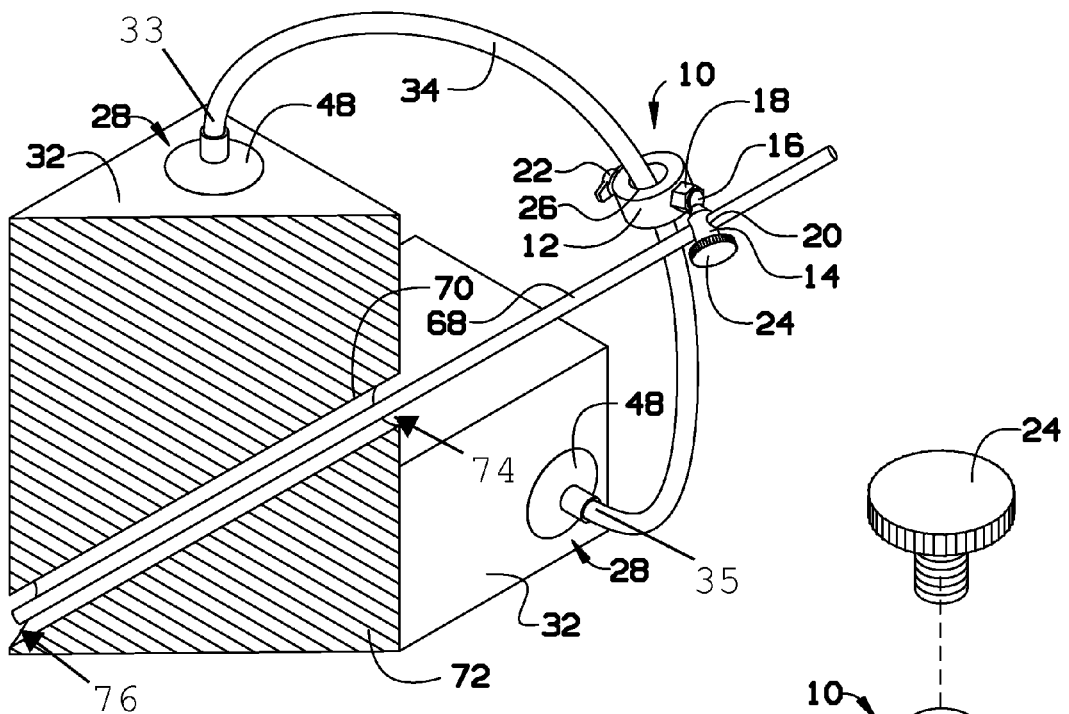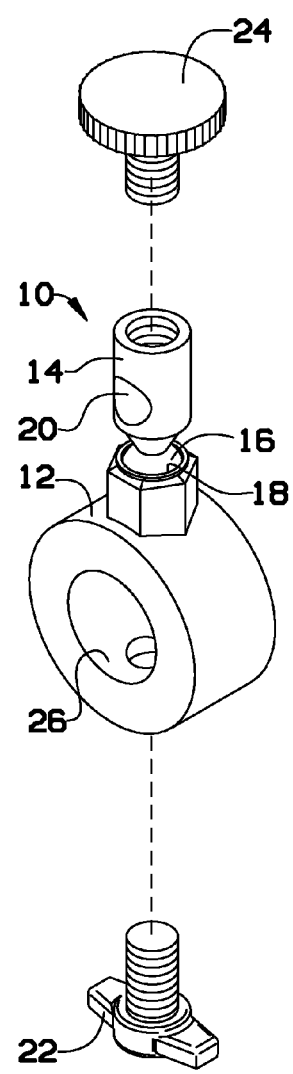
FIG. 1
FIG. 2
FIG. 3
FIG. 4

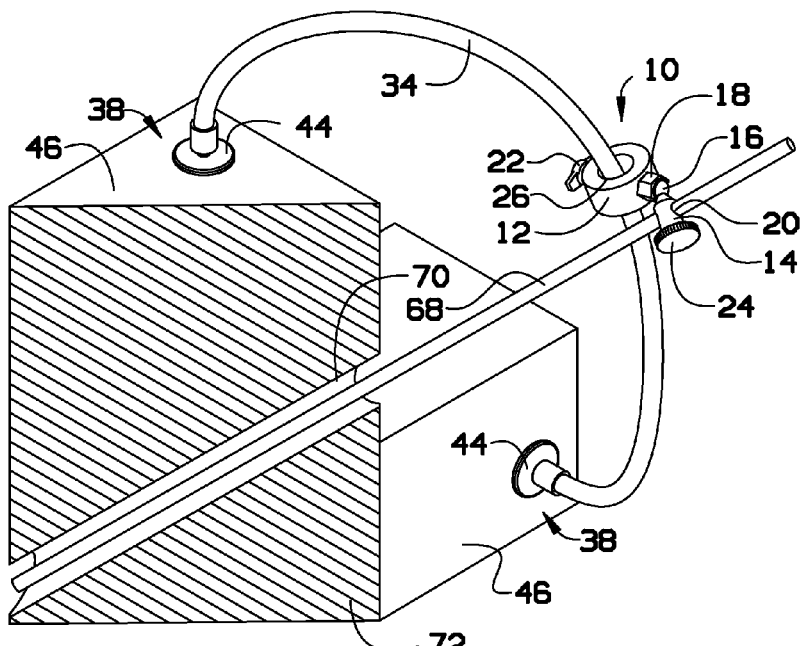
FIG.5
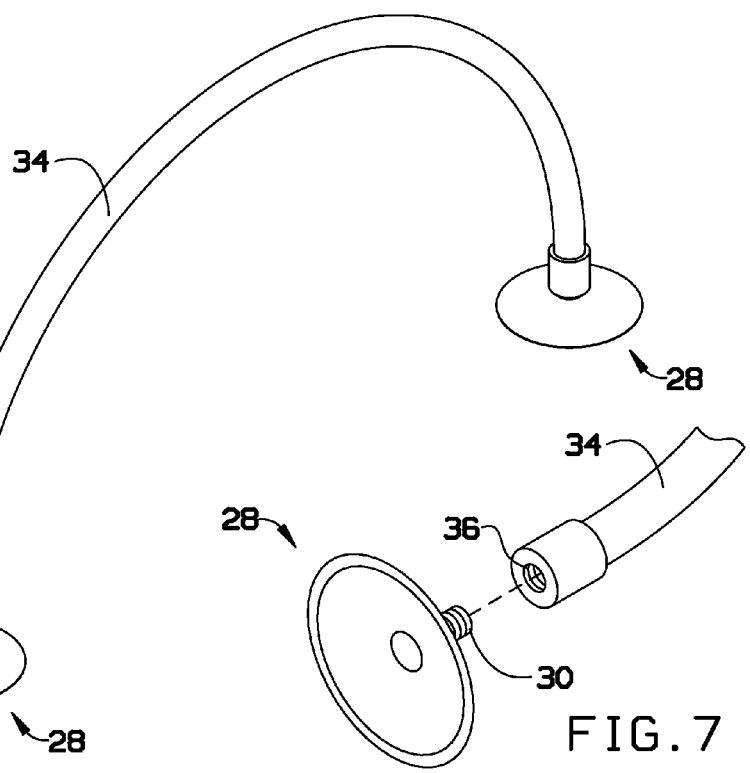
FIG.6
FIG.7

SYSTEM AND METHOD FOR DEMONSTRATING A PATH OF A PROJECTILE

BACKGROUND OF THE INVENTION

The present invention relates to a flexible arm bracket that holds a trajectory rod in place for measuring projectile defects.

There are problems dealing with improper measurements and not being able to see where the trajectory rod is placed.

As can be seen, there is a need for solutions to these and other problems.

SUMMARY OF THE INVENTION

In one aspect of the present invention, a system for demonstrating a path, such as a flight path, of a projectile comprises: a flexible wire; a first attachment device connected to a first end of the flexible wire; a second attachment device connected to a second end of the flexible wire; and a coupling assembly comprising a trajectory rod attachment device configured to attach to a trajectory rod and a wire attachment device movably connected to the trajectory rod attachment device and configured to attach to the flexible wire.

In one aspect, the coupling assembly comprises a ball and socket, wherein the wire attachment device is rotatably movable relative to the trajectory rod attachment device. In one aspect, the wire attachment device comprises a threaded screw and a threaded hole configured so that the wire attachment device grips the flexible wire by tightening the threaded screw. In one aspect, at least one of the first attachment device and the second attachment device is removably connected to the flexible wire. In one aspect, at least one of the first attachment device and the second attachment device is removably connected to the flexible wire via a male threaded portion mated to a female threaded portion.

In one aspect, at least one of the first attachment device and the second attachment device comprises a suction cup. In one aspect, at least one of the first attachment device and the second attachment device comprises a clamp. In one aspect, at least one of the first attachment device and the second attachment device comprises a magnet. In one aspect, at least one of the first attachment device and the second attachment device comprises a substantially flat surface having a plurality of holes and configured for attachment to a surface via screws passing through the plurality of holes. In one aspect, the first attachment device and the second attachment device comprise different elements from a set consisting of: a suction cup, a clamp, a magnet, and a substantially flat surface having a plurality of holes and configured for attachment to a surface via screws passing through the plurality of holes. In one aspect, the system further comprises the trajectory rod.

In one aspect, a method for demonstrating a path of a projectile comprises: providing the system discussed; providing a trajectory rod; identifying a first point in the path of the projectile; identifying a second point in the path of the projectile; attaching the first attachment device to a first region; bending the flexible wire; attaching the second attachment device to a second region; placing the trajectory rod through the first and second points; attaching the wire attachment device to the flexible wire; and attaching the trajectory rod attachment device to the trajectory rod so that the trajectory rod is substantially parallel with a line passing through the first and second points.

In one aspect, the coupling assembly comprises a ball and socket, wherein the wire attachment device is rotatably movable relative to the trajectory rod attachment device, and wherein the method further comprises adjusting the trajectory rod attachment device relative to the wire attachment device. In one aspect, the first attachment device is removably connected to the first end, and wherein the method further comprises removing the first attachment device and attaching a third attachment device to the first end. In one aspect, the first attachment device comprises a magnet and the third attachment device comprises a suction cup.

These and other features, aspects and advantages of the present invention will become better understood with reference to the following drawings, description and claims.

BRIEF DESCRIPTION OF THE DRAWINGS

FIG. 1: is a perspective view of an embodiment of the invention shown in use with suction cup end screw attachments.

FIG. 2: is a perspective view of an embodiment of the coupling assembly.

FIG. 3: is a section detail view of an embodiment of the invention along line 3-3 in FIG. 2.

FIG. 4: is an exploded view of an embodiment of the coupling assembly.

FIG. 5 is a perspective view of an embodiment of the invention shown in use with magnetic end screw attachments.

FIG. 6: is a perspective view of an embodiment of the invention.

FIG. 7: is a detail exploded view of an embodiment of the invention.

DETAILED DESCRIPTION OF THE INVENTION

Figure 8:
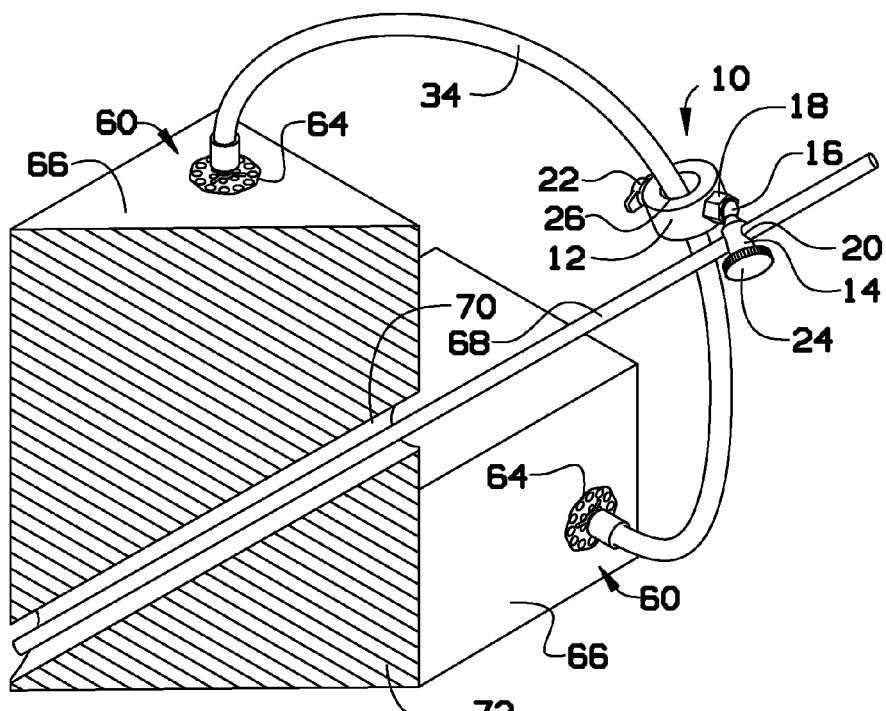
FIG. 8 is a perspective view of an embodiment of the invention shown in use with drywall end screw attachment.
Figure 9:
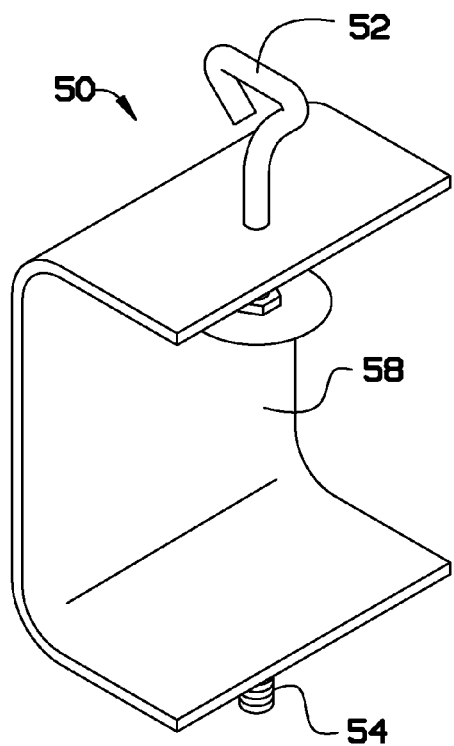
FIG. 9: is a perspective view of an embodiment of the invention with clamp end screw attachment.
Figure 10:
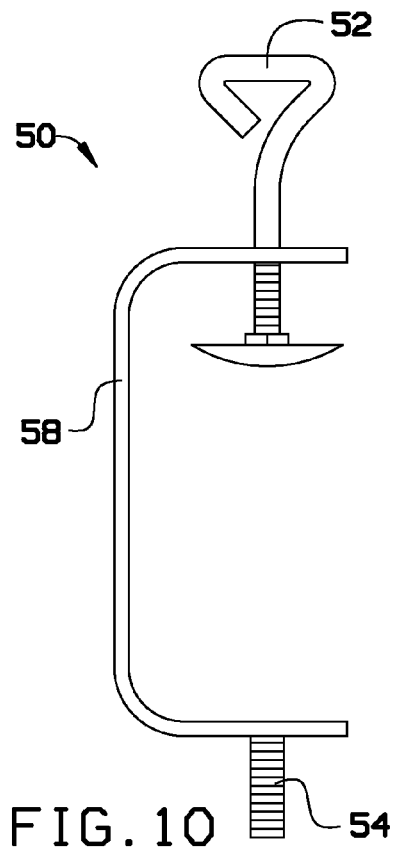
FIG. 10: is a front view of an embodiment of the invention with clamp end screw attachment.

The following detailed description is of the best currently contemplated modes of carrying out exemplary embodiments of the invention. The description is not to be taken in a limiting sense, but is made merely for the purpose of illustrating the general principles of the invention.

Referring now to the figures, the following reference numbers may refer to elements of the invention:
- 10: is the coupling assembly.
- 12: is the coupling wire ring.
- 14: is the coupling trajectory rod bracket.
- 16: is the coupling trajectory rod bracket ball.
- 18: is the coupling socket.
- 20: is the coupling trajectory rod bracket shaft.
- 22: is the coupling wire thumb screw.
- 24: is the coupling trajectory rod thumbscrew.
- 26: is the coupling wire ring shaft.
- 28: is the suction cup end screw attachment.
- 30: is the suction cup end screw attachment male thread.
- 32: is the exemplary flat non-porous surface for suction cup attachment.

34: is the flexible wire.
36: is the flexible wire female threaded shaft end.
38: is the magnetic end screw attachment.
40: is the magnetic end screw attachment male thread.
44: is the magnetic end screw attachment magnetic plate.
46: is the exemplary magnetic surface.
48: is the suction cup end screw attachment suction skirt.
50: is the clamp end screw attachment.
52: is the clamp end screw attachment clamp screw.
54: is the clamp end screw attachment male thread.
56: is the exemplary clamp end screw attachment structure.
58: is the clamp end screw body.
60: is the drywall end screw attachment for attaching to drywall (such as Sheetrock™)
62: is the drywall end screw attachment male thread.
64: is the drywall end screw attachment plate.
66: is the exemplary drywall surface.
68: is the trajectory rod.
70: is the exemplary trajectory path.
72: is the exemplary trajectory path object.

An embodiment of the present invention allows more precise measurements of projectile defects. It allows one user to complete the task. It allows the user to see the trajectory rod properly placed on the leading edge and secondary defect. It securely holds the rod in place for photography examination. It allows the most accurate measurement and allows proper photographic documentation with one user.

This invention is an improvement on what currently exists. Nothing exists in the field of crime scene like the present invention. The item now used is a circular cone that must be forced into a defect and moves the trajectory rod off the proper marks, giving an incorrect measurement. This cone-shaped device is forced into a defect and moves the trajectory rod off the leading edge and secondary defect.

The present invention is placed on a vehicle, interior wall, window or any surface where a projectile may have struck the surface and perforated it. For this example a vehicle's car door will be utilized with suction cups, one above the defect and one below the defect. Now affixed to the vehicle, a user adjusts the coupling to approximately where the trajectory rod would go. Then the user places the trajectory rod through the ball joint. The trajectory rod must be placed on the leading edge and continue until it meets the secondary defect. The user tightens the thumb screws on both the coupling and ball joint. The user checks the position of the trajectory for proper alignment. Utilizing the device's suction cups, magnets or metal brackets, this device attaches to different surfaces, such as metal, fiberglass, plastic, drywall, wood and carpet.

Referring to the drawings, a system for demonstrating a path of a projectile comprises: a flexible wire 34; a first attachment device (which may include any of the devices 28, 38, 50, 60) connected to a first end 33 of the flexible wire 34; a second attachment device (which may include any of the devices 28, 38, 50, 60, and which may or may not be the same type as that of first attachment device) connected to a second end 35 of the flexible wire 34; and a coupling assembly 10 comprising a trajectory rod attachment device 14 configured to attach to a trajectory rod 68 and a wire attachment device 12 movably connected to the trajectory rod attachment device 14 and configured to attach to the flexible wire 34. The system may include the trajectory rod 64, which may simply be a substantially straight rod allowing visual indication of a trajectory of a projectile, such as a bullet.

The flexible wire 34 may comprise any long implement that can be easily bent by human hands but also maintains its shape. For example, it may comprise a metal wire of a gauge sufficient to be flexed by human hands. It may also be enwrapped by a material to make the wire 34 smooth to the touch, such as plastic, rubber, cloth, or any other soft material.

Figure 11:
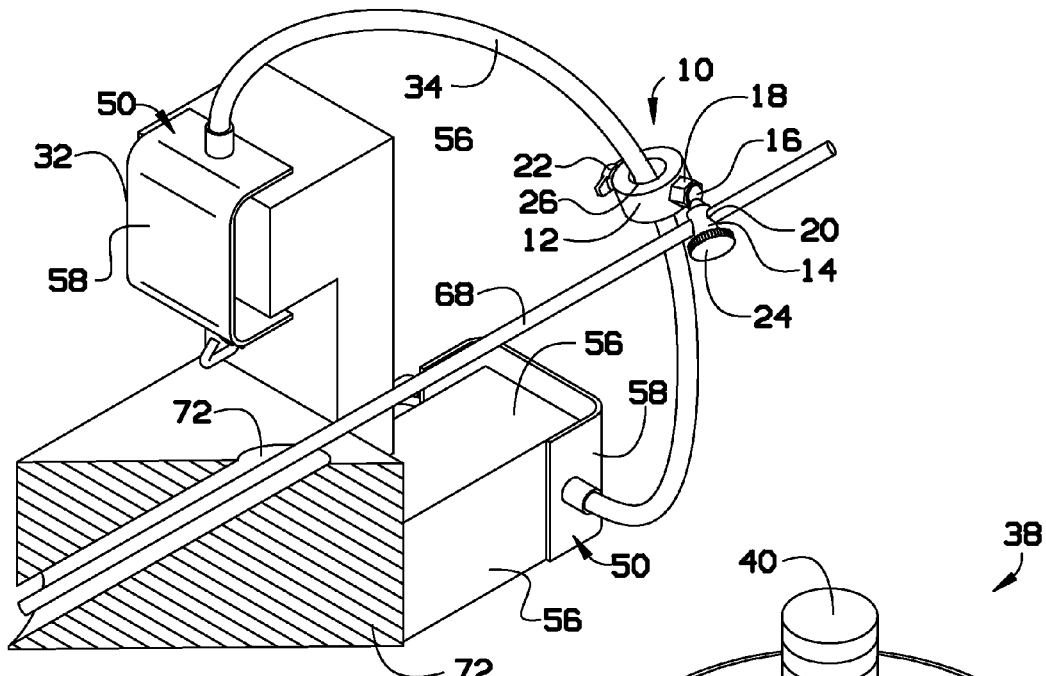
FIG. 11 is a perspective view of an embodiment of the invention shown in use with clamp end screw attachment.
Figure 12:
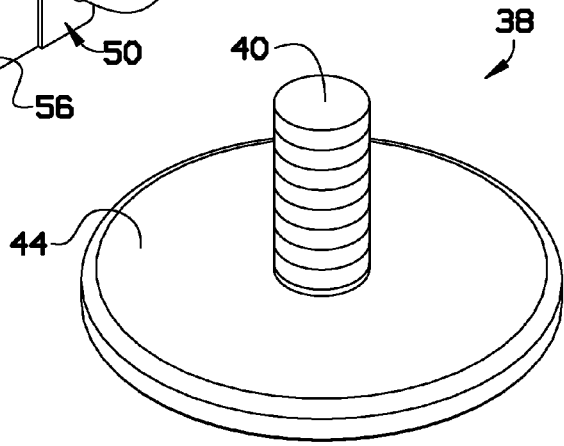
FIG. 12: is a perspective view of an embodiment of the invention with magnetic end screw attachment.
Figure 13:
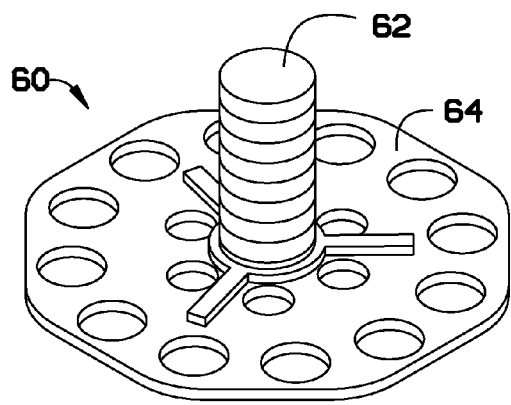
FIG. 13: is a perspective view of an embodiment of the invention with suction cup end screw attachment.
Figure 14:
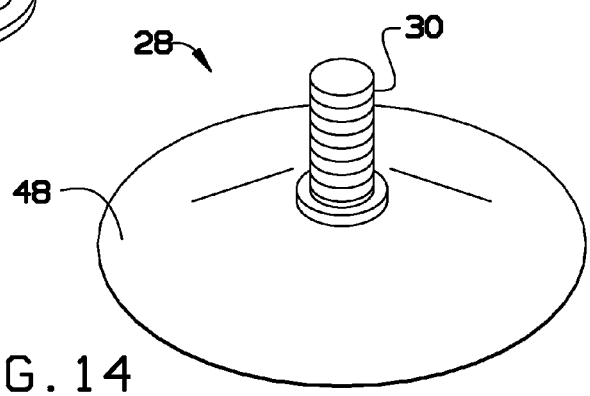
FIG. 14: is a perspective view of an embodiment of the invention with suction cup end screw attachment.

The attachment devices may comprise any devices connectable to the flexible wire 34 and also capable of being attached to other surfaces, such as suction cup device 28, magnet device 38, clamp device 50, and drywall device 60, or any other device capable of attaching to objects. The clamp device 50 may comprise any device that clamps onto an object and includes any clamp known in the art. As shown in FIG. 11, the clamp device 50 may clamp onto an object or, in the case of crime scenes involving automobiles, may clamp onto a steering wheel or any object on or within the automobile. The drywall device 60 may comprise a substantially flat surface (e.g., drywall end screw attachment plate 64) having a plurality of holes and configured for attachment to a surface (such as drywall) via screws passing through the plurality of holes. Alternatively or in addition, the substantially flat surface may or may not have holes and may instead be adhered to a surface using a temporary or permanent adhesive, or any other known means for attaching to an object.

In one aspect, the coupling assembly comprises a ball 16 and socket 18, so that the wire attachment device 12 is rotatably movable relative to the trajectory rod attachment device 14, and/or may swivel, allowing the trajectory rod 68 to be more precisely placed relative to points in the path of a projectile.

In one aspect, the wire attachment device 12 comprises a threaded screw 22 and a threaded hole to accommodate the screw 22 and configured so that the wire attachment device 12 grips the flexible wire 34 by tightening the threaded screw 22, as shown in FIG. 4. Any other means of firmly fastening the wire attachment device 12 to the wire 34 is within the scope of the present invention. Further, the trajectory rod attachment device 14 comprises a threaded screw 24 and a threaded hole to accommodate the screw 24 and configured so that the trajectory rod attachment device 14 grips the trajectory rod 68 by tightening the threaded screw 24, as shown in FIG. 4. Any other means of firmly fastening the trajectory rod attachment device 14 to the trajectory rod 68 is within the scope of the present invention.

In one aspect, at least one of the first attachment device and the second attachment device is removably connected to the flexible wire 34, such as via a male threaded portion mated to a female threaded portion. For example, in FIG. 7, suction cup device 28 comprises a male threaded portion 30 that is connectable to the flexible wire 34 via female threaded portion 36; any other attachment devices may be attached to the wire 34 in a similar manner. The connection need not be via threading; any other means of connecting the attachment devices to the wire 34 (such as magnets, clips, snaps, Velcro™, etc.) is within the scope of the present invention.

In another aspect, a method for demonstrating a path of a projectile comprises: providing the system as described; providing a trajectory rod 68;

identifying a first point 74 in the path of the projectile; identifying a second point 76 in the path of the projectile; attaching the first attachment device to a first region, which may be the surface of an object near or proximal to the first point 74 (e.g., in the case of an automobile crime scene, the first region might be a windshield or a body of the automobile); bending the flexible wire 34; attaching the second attachment device to a second region, which may be the surface of an object near or proximal to the first point 74 (e.g., in the case of an automobile crime scene, the first region might be a windshield or a body of the automobile); placing the trajectory rod 68 through the first and second points 74, 76; attaching the wire attachment device 12 to the flexible wire 34; and attaching the trajectory rod attachment device 14 to the trajectory rod 68 so that the trajectory rod 68 is substantially parallel with a line passing through the first and second points 74, 76. The method may further comprise bending the wire 34 again and/or moving or adjusting the trajectory rod attachment device 14 relative to the wire attachment device 12 to better position the trajectory rod 68.

In one aspect, the method includes removing and replacing various attachment devices, such as by removing a suction cup device 28 from the wire 34 and replacing it with a magnet device 38 or any other attachment device.

It should be understood, of course, that the foregoing relates to exemplary embodiments of the invention and that modifications may be made without departing from the spirit and scope of the invention.

What is claimed is:

1. A system for demonstrating a path of a projectile, comprising:
    a flexible wire;
    a first attachment device connected to a first end of the flexible wire;
    a second attachment device connected to a second end of the flexible wire; and
    a coupling assembly comprising a trajectory rod attachment device configured to attach to a trajectory rod and a wire attachment device movably connected to the trajectory rod attachment device and configured to attach to the flexible wire.

2. The system as claimed in claim 1, wherein the coupling assembly comprises a ball and socket, wherein the wire attachment device is rotatably movable relative to the trajectory rod attachment device.

3. The system as claimed in claim 1, wherein the wire attachment device comprises a threaded screw and a threaded hole configured so that the wire attachment device grips the flexible wire by tightening the threaded screw.

4. The system as claimed in claim 1, wherein at least one of the first attachment device and the second attachment device is removably connected to the flexible wire.

5. The system as claimed in claim 1, wherein at least one of the first attachment device and the second attachment device is removably connected to the flexible wire via a male threaded portion mated to a female threaded portion.

6. The system as claimed in claim 1, wherein at least one of the first attachment device and the second attachment device comprises a suction cup.

7. The system as claimed in claim 1, wherein at least one of the first attachment device and the second attachment device comprises a clamp.

8. The system as claimed in claim 1, wherein at least one of the first attachment device and the second attachment device comprises a magnet.

9. The system as claimed in claim 1, wherein at least one of the first attachment device and the second attachment device comprises a substantially flat surface having a plurality of holes and configured for attachment to a surface via screws passing through the plurality of holes.

10. The system as claimed in claim 1, wherein the first attachment device and the second attachment device comprise different elements from a set consisting of: a suction cup, a clamp, a magnet, and a substantially flat surface having a plurality of holes and configured for attachment to a surface via screws passing through the plurality of holes.

11. The system as claimed in claim 1, further comprising the trajectory rod.

12. A method for demonstrating a path of a projectile, comprising:
    providing the system as claimed in claim 1;
    providing a trajectory rod;
    identifying a first point in the path of the projectile;
    identifying a second point in the path of the projectile;
    attaching the first attachment device to a first region;
    bending the flexible wire;
    attaching the second attachment device to a second region;
    placing the trajectory rod through the first and second points;
    attaching the wire attachment device to the flexible wire; and
    attaching the trajectory rod attachment device to the trajectory rod so that the trajectory rod is substantially parallel with a line passing through the first and second points.

13. The method as claimed in claim 12, wherein the coupling assembly comprises a ball and socket, wherein the wire attachment device is rotatably movable relative to the trajectory rod attachment device, and wherein the method further comprises adjusting the trajectory rod attachment device relative to the wire attachment device.

14. The method as claimed in claim 12, wherein the first attachment device is removably connected to the first end, and wherein the method further comprises removing the first attachment device and attaching a third attachment device to the first end.

15. The method as claimed in claim 14, wherein the first attachment device comprises a magnet and the third attachment device comprises a suction cup.

* * * * *